(12) United States Patent
Mizukami et al.

(10) Patent No.: US 6,796,729 B2
(45) Date of Patent: Sep. 28, 2004

(54) SHUTTER FOR CAMERA (75) Inventors: Hiroyuki Mizukami, Narashino (JP); Seiichi Imano, Narashino (JP); Atsushi Takami, Narashino (JP); Seiichi Oishi, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 68 days.

(21) Appl. No.: 10/041,275

(22) Filed: Jan. 8, 2002

(65) Prior Publication Data

US 2002/0094204 A1 Jul. 18, 2002

(30) Foreign Application Priority Data

Jan. 9, 2001 (JP) ........................................ 2001-001474
Dec. 14, 2001 (JP) ........................................ 2001-381399

(51) Int. Cl.$^7$ .............................. G03B 9/20; G03B 9/08
(52) U.S. Cl. ...................... 396/497; 396/493; 396/463; 396/475
(58) Field of Search ................................ 396/463, 493, 396/495, 497

(56) References Cited

U.S. PATENT DOCUMENTS

| | | | | |
|---|---|---|---|---|
| 4,893,142 A | * | 1/1990 | Ishida et al. | 396/463 |
| 5,602,610 A | * | 2/1997 | Akimoto et al. | 396/449 |
| 6,027,260 A | * | 2/2000 | Oda et al. | 396/497 |
| 6,473,217 B2 | * | 10/2002 | Imano | 359/227 |

* cited by examiner

Primary Examiner—Russell Adams
Assistant Examiner—Michael Dalakis
(74) Attorney, Agent, or Firm—Adams & Wilks

(57) ABSTRACT

A shutter for a camera capable of opening a shutter sector in a reduced period of time includes a shutter opening formed in a shutter plate, shutter sectors for opening and closing the shutter opening, a drive lever having a drive pin for operating the shutter sectors, and an actuator for driving the drive lever. The drive pin penetrates through-holes formed in the shutter sectors. The through-holes have a size sufficiently large so that the drive lever is driven by the actuator substantially in a no-load state immediately after starting to drive the drive lever so that the shutter sectors are not moved until the drive pin has achieved sufficient acceleration.

20 Claims, 8 Drawing Sheets

SHUTTER FOR CAMERA

FIELD OF THE INVENTION

The present invention relates generally to a shutter for a camera and, more particularly, to a shutter for a camera capable of opening and closing a shutter opening in a reduced time period.

BACKGROUND DISCUSSION

Figure 9:
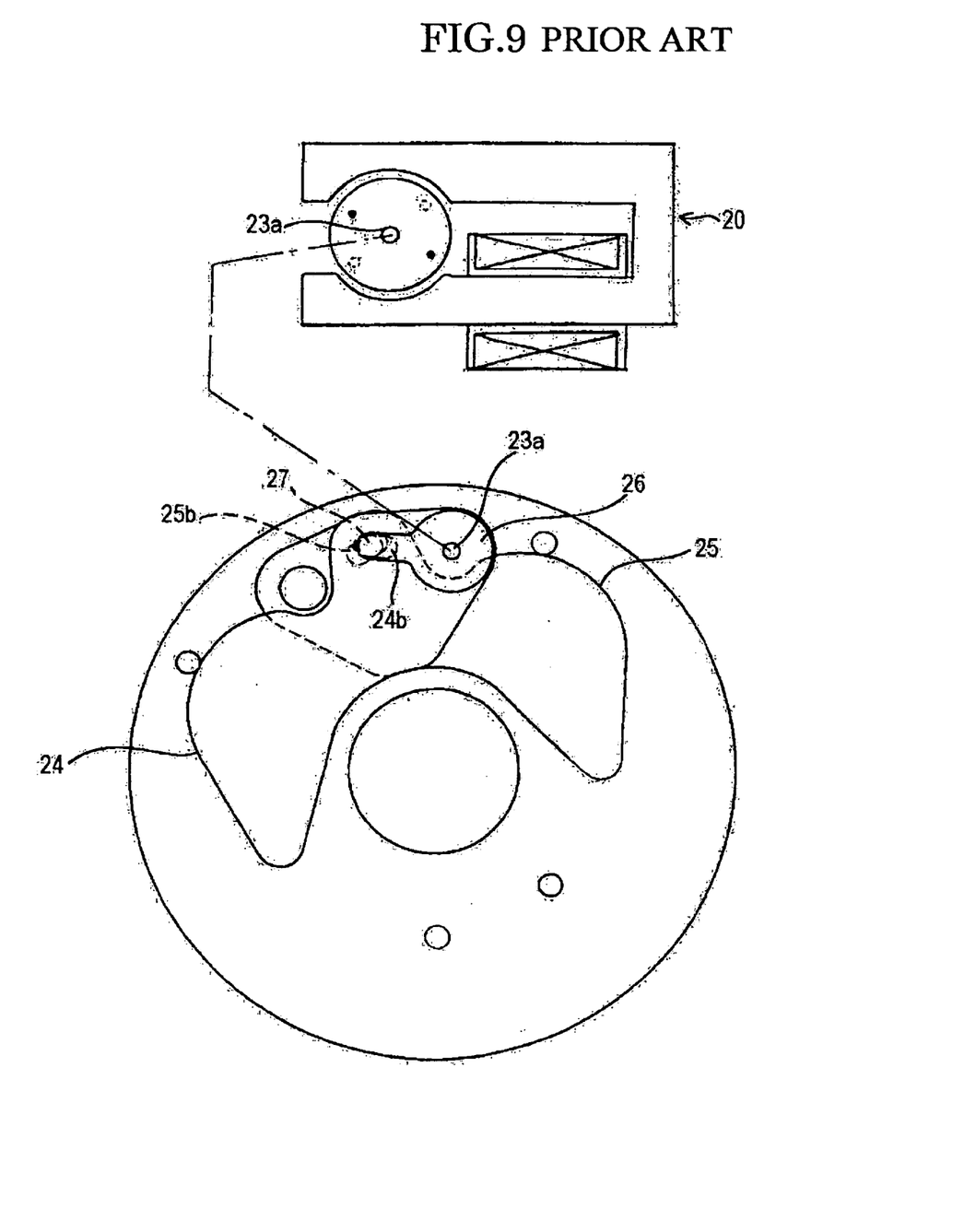
FIG. 9 shows a conventional shutter and is a front view in a state of opening a shutter opening.

A conventional shutter for a camera is shown in FIG. 9. A drive pin 27 is provided on a drive lever 26 pivoted by a rotor shaft 23a of an actuator 20 and the drive pin 27 penetrates through elongated holes 24b and 25b formed in shutter sectors 24 and 25. As shown in the enlarged view of FIG. 10, the drive pin 27 is slidably engaged with the elongated through-holes 24b and 25b.

Figure 6:
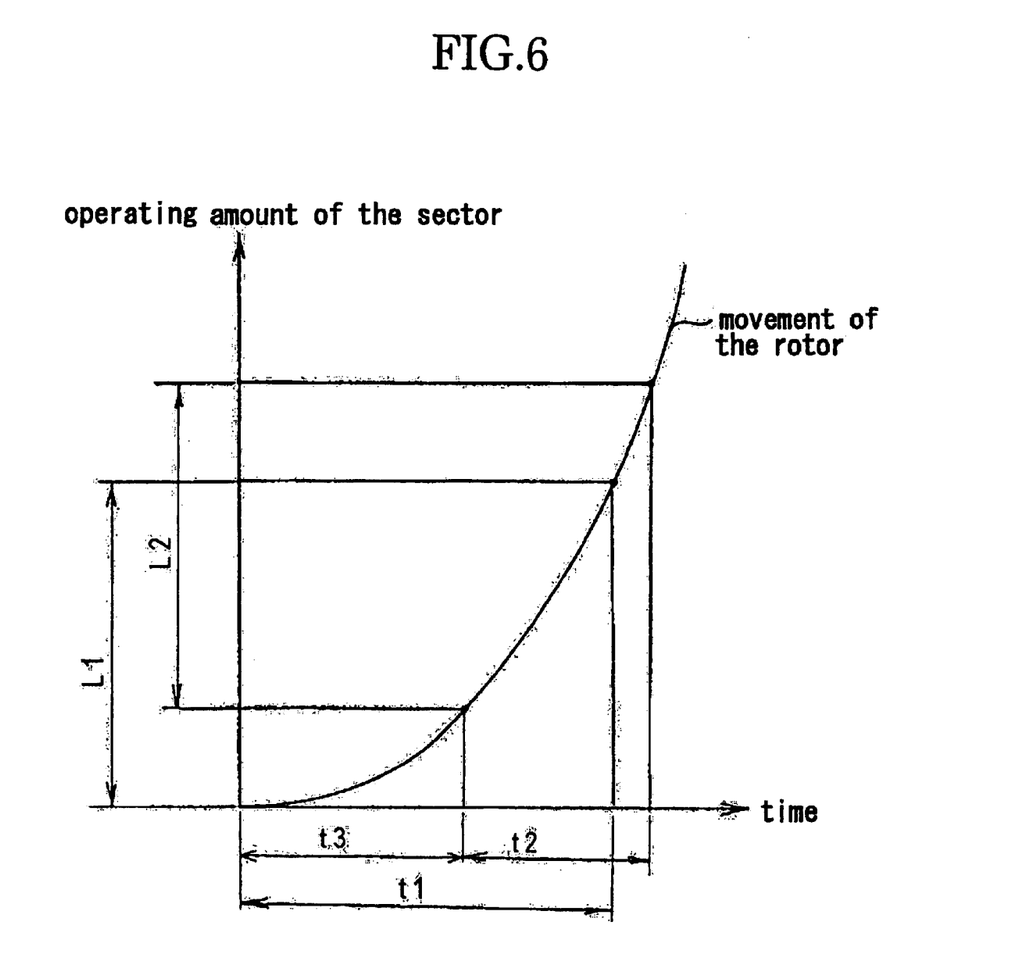
FIG. 6 is a graph showing a relationship between movement distance of the shutter sector and the operation of a rotor.

The conventional construction described above ensures that when the drive lever 26 is pivoted by the rotor shaft 23a and the drive pin 27 starts moving, movement of the drive pin 27 is immediately transmitted to the shutter sectors 24 and 25. In FIG. 6, movement of the rotor is shown by a graph in which the ordinate designates the amount of movement of a respective shutter sector and the abscissa designates time. According to the conventional construction in which the drive pin 27 is slidably engaged with the elongated through holes 24b and 25b, the shutter sectors are operated simultaneously with the starting movement of the rotor. At an initial stage of the starting movement of the rotor, the rotor has not yet sufficiently accelerated. Therefore, only an extremely small movement of the shutter sectors is achieved during the initial time period. However, after the rotor has been sufficiently accelerated, the movement amount of the shutter sectors is rapidly increased. If the necessary movement distance of the shutter sectors is designated by notation L1, a time period of t1 is needed to achieve the movement distance L1.

SUMMARY OF THE INVENTION

As shown in FIG. 6, in the conventional structure described above, at the initial stage of movement of the rotor, the amount of movement of the shutter sectors is extremely small. Therefore, a relatively large time period t3 is needed to achieve a small amount of movement. A substantial portion of the total time period t1 is taken up by time period t3, thereby substantially increasing the time needed to achieve the necessary movement distance L1 of the shutter sectors. The loss of operating time period occupied by time period t3 is fairly significant.

The present invention provides a shutter for a camera having a structure effective for preventing the loss of operating time period associated with the prior art to achieve a desired movement distance of a shutter sector in a short period of time.

According to one aspect of the present invention, there is provided a shutter for a camera comprising a base plate having a shutter opening formed therein, a shutter sector capable of opening and closing the shutter opening, an operating member for operating the shutter sector, and an actuator for driving the operating member. The operating member penetrates a through-hole provided in the shutter sector, and the through-hole has a size sufficient to drive the operating member substantially in a no-load state immediately after starting to drive the operating member.

By driving the operating member in the no-load state immediately after starting to drive the operating member and at a point in time when the operating member has not yet reached full acceleration, slow operation of the shutter sector is avoided. By operating the shutter sector immediately thereafter, a desired amount of movement of the shutter sector can be achieved in a short period of time.

According to another aspect of the invention, there is provided a shutter for a camera comprising a base plate having a shutter opening formed therein, a shutter sector capable of opening and closing the shutter opening, an operating member for operating the shutter sector, a start member for operating the operating member, and an actuator for driving the start member. A gap is provided between the start member, and the operating member the gap having a size sufficient for driving the start member substantially in a no-load state until the start member is brought into contact with the operating member.

Preferably, the operating member or the starting member is provided such that a width of the region in which the operating member or the starting member is driven in the no-load state immediately after starting to drive the operating member or the starting member can be adjusted.

DETAILED DESCRIPTION OF THE PREFERRED EMBODIMENTS

An description will be given of a best mode for carrying out the invention based on various embodiments with reference to the attached drawings, the invention not being limited to the precise embodiments disclosed herein.

Figure 1:
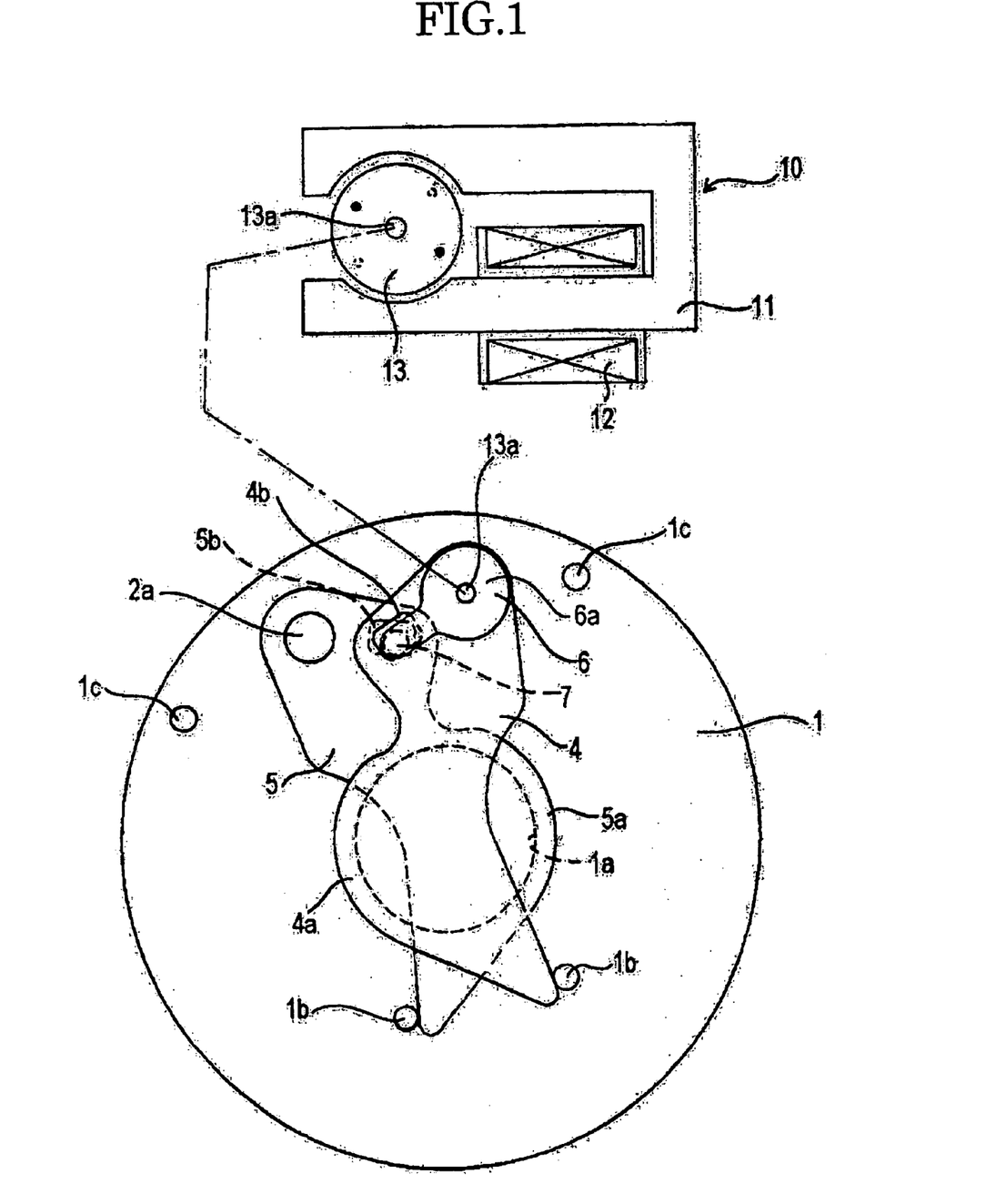
FIG. 1 shows a first embodiment of the invention and is a front view in a state of closing a shutter opening.
Figure 2:
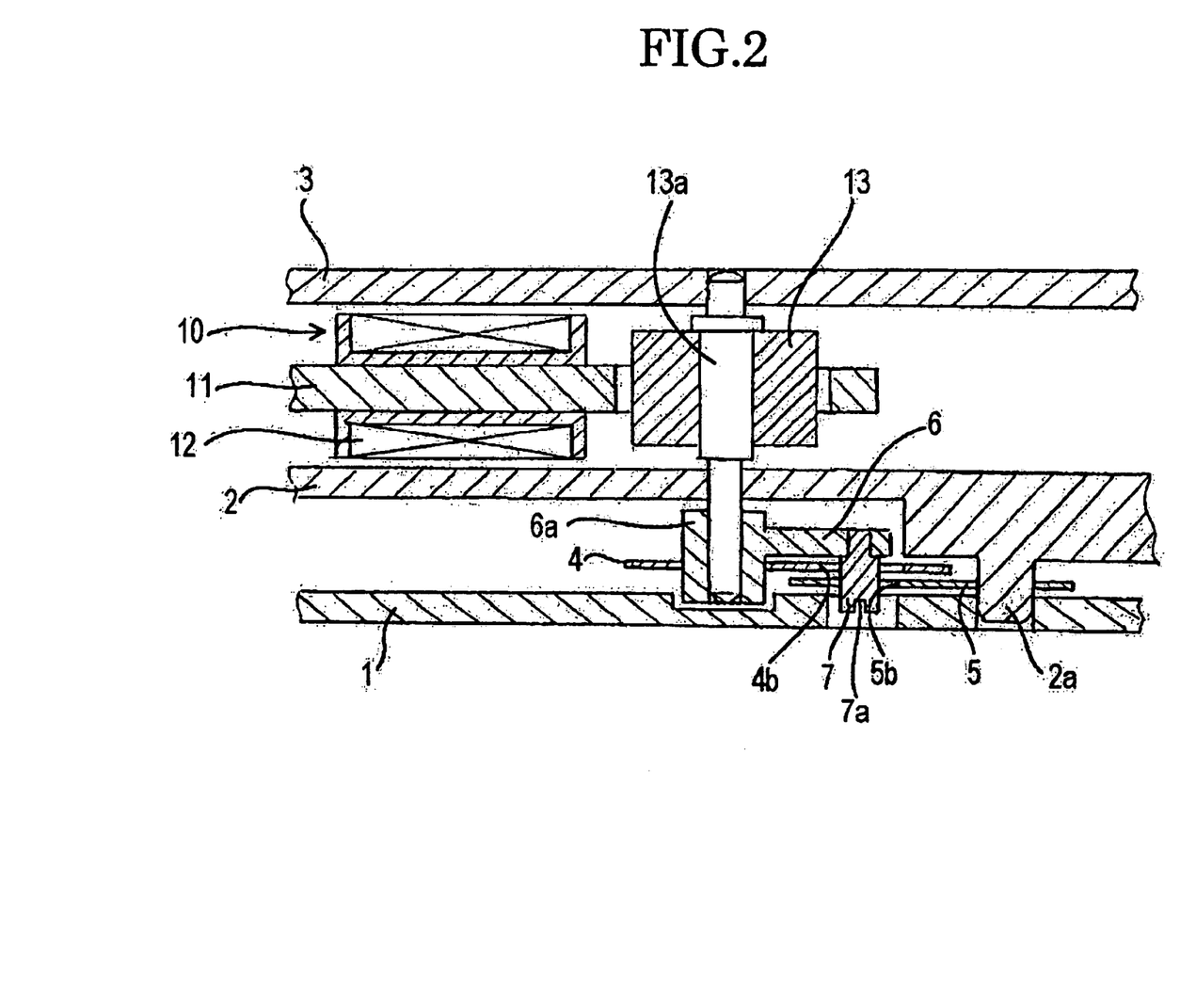
FIG. 2 is a cross-sectional view of a portion of the first embodiment.

A first embodiment of the invention is shown by FIG. 1 and FIG. 2. There is provided a shutter opening 1a in a shutter base plate 1 constituting a lower plate. On an upper side of the shutter base plate 1 there are arranged a middle plate 2 and an upper plate 3 respectively spaced apart from each other by predetermined intervals. Between the shutter base plate 1 and the middle plate 2 there are arranged a pair of movable shutter sectors 4 and 5 for opening and closing the shutter opening 1a, and a drive lever 6 and a drive pin 7 constituting operating members for driving the movable shutter sectors 4 and 5.

Front end portions 4a and 5a of the two shutter sectors 4 and 5 are formed in shapes capable of closing the shutter opening 1a in cooperation with each other. The shutter sector 4 is pivotally mounted on a shaft portion 6a of the drive lever 6 at its base portion and the shutter sector 5 is pivotally mounted at a center shaft 2a projecting downward from the middle plate 2 at its base portion. On the shutter base plate 1, there are provided positioning pins 1b and 1c for restricting pivoting movement of the shutter sectors 4 and 5. In a state of closing the shutter opening 1a of FIG. 1, the sectors 4 and 5 are positioned by being brought into contact with the positioning pins 1b.

Between the middle plate 2 and the upper plate 3, there is arranged an actuator 10 for driving the operating members 6 and 7. The actuator 10 is comprised of a stator comprising an iron core 11 having a U-shape or channel-like shape, a coil 12 wound around one leg of the core 11 and a rotor 13 capable of being magnetically coupled to a magnetic pole portion of the iron core 11. A rotor shaft 13a of the rotor 13 penetrates the middle plate 2, a distal end thereof being fitted to a center hole of the shaft portion 6a of the drive lever 6, and the drive lever 6 is pivotally driven by pivotal movement of the rotor 13.

At a front end portion of the drive lever 6, the drive pin 7 is fixed by press-fitting. In the vicinity of the base portions of the two shutter sector members 4 and 5, there are provided through-holes 4b and 5b through which the drive pin 7 penetrates. Sizes of the through-holes 4b and 5b are set such that a sufficient gap x (illustrated in FIG. 4) is present to surround the drive pin 7 in at least a direction of movement of the drive pin 7 (in a substantially up and down direction in the present embodiment) while the drive pin 7 penetrates the through-holes 4b and 5b. The gap x is set to a size sufficient for driving the drive pin substantially in a no-load state immediately after starting to drive the drive pin 7. In other words, when the drive pin 7 is first driven, it does not come into immediate contact with the sectors 4 and 5 due to the presence of the gap x. The state of driving the drive lever 6 before the drive pin 7 comes into contact with the shutter sectors 4 and 5 is referred to herein as a no-load state.

In the conventional shutter structure, the through-holes 4b and 5b penetrated by the drive pin 7 are provided with a small gap on the outer side of the drive pin 7 in the direction of movement of the drive pin 7. However, the gap in the conventional structure is merely provided for fitting tolerance and has a size of only about 0.02 through 0.03 mm, so that the drive pin 7 comes into immediate contact with the shutter sectors when the operating lever is driven. In the present embodiment, the size of the gap x sufficient for driving the drive pin 7 substantially in the no-load state until the drive lever 6 reaches full acceleration is about 0.18 mm, or about six times as large as that in the conventional structure. Although a pertinent size of the gap sufficient for driving the drive pin 7 substantially in a no-load state varies based on the size of the shutter or a characteristic of the actuator motor, the size is preferably in the range of about 0.1 through 0.3 mm.

Figure 3:
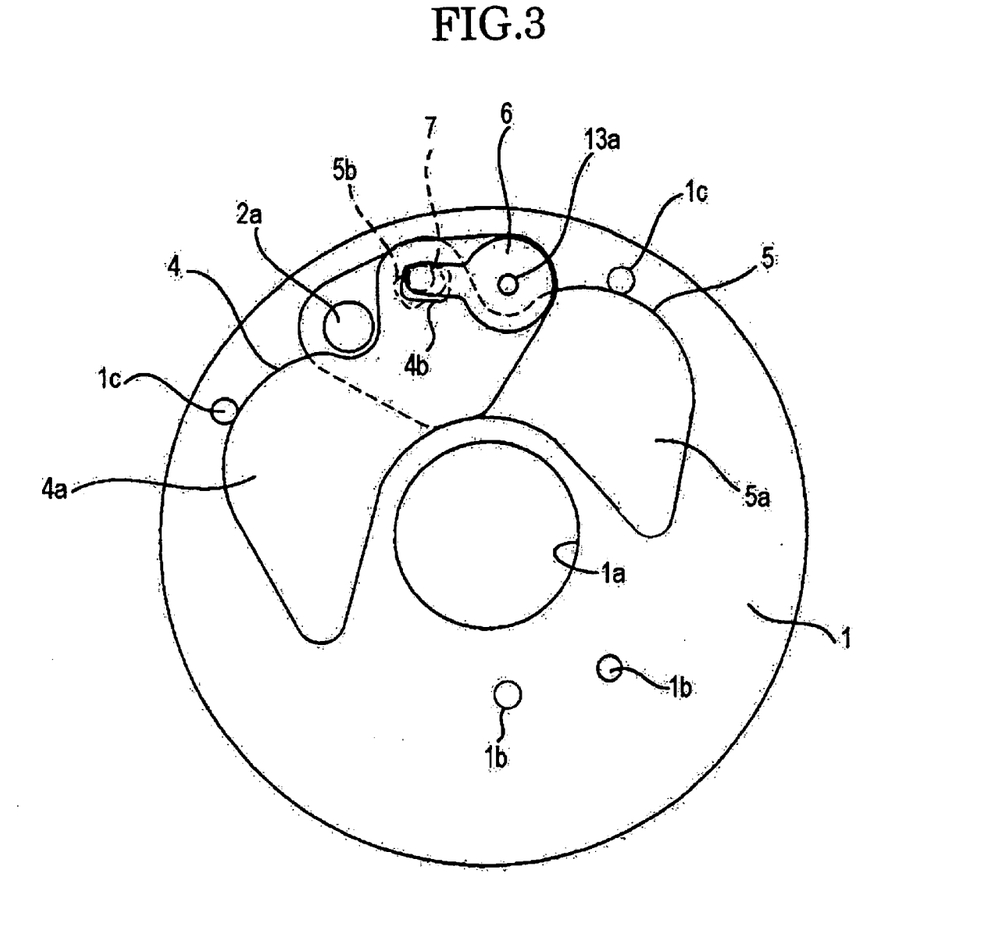
FIG. 3 is a front view of a state of opening the shutter opening.

FIG. 3 shows a state in which by rotating the rotor 13, the drive lever 6 is pivoted from the state of FIG. 1 in the clockwise direction and the front end portions 4a and 5a of the shutter sectors 4 and 5 are retracted from the shutter opening 1a. In the open state of the shutter opening 1a, the shutter sector 4 is positioned by being brought into contact with the positioning pin 1c.

Figure 4:
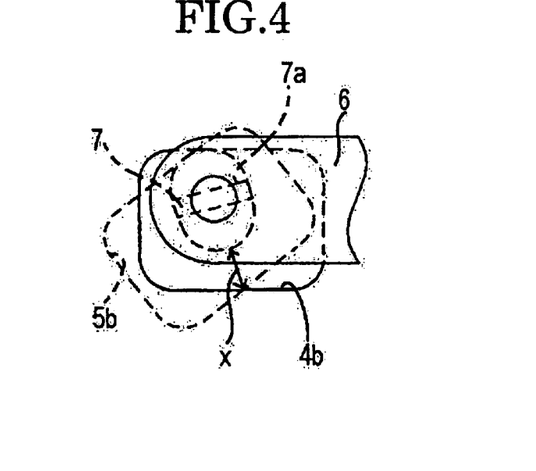
FIG. 4 is an enlarged front view of a portion of FIG. 3.

A more detailed explanation of the gap x formed between the drive pin 7 and the through-holes 4b and 5b will now be provided. FIG. 3 shows the shutter opening 1a in an opened state by the two shutter sectors 4 and 5. As shown in FIG. 4, the drive pin 7 is disposed at an upper side of the respective through-holes 4a, 5a. Accordingly, the gap x is disposed on a lower side of the drive pin 7. On the other hand, when the shutter opening 1a is closed by the two shutter sectors 4 and 5, the drive pin 7 is disposed at the lower side of the respective through-holes 4a, 5a (not illustrated) conversely to the case of FIG. 4. Accordingly, the gap x is disposed on the upper side of the drive pin 7 in the closed state of the shutter opening 1a.

The drive pin 7 is formed substantially in an irregular shape to enable adjustment of the gap x. In the illustrated embodiment, the drive pin 7 is formed in an oval shape and has a groove 7a formed at its head end (the portion that extends through the through holes 4a, 5a). By inserting a flat driver into the groove 7a and rotating the drive pin 7, the size of the gap x can be adjusted due to the oval shape of the drive pin 7. By adjusting the size of the gap x, the shutter speed can be adjusted. Such adjustment is typically a factory performed adjustment.

Figure 5:
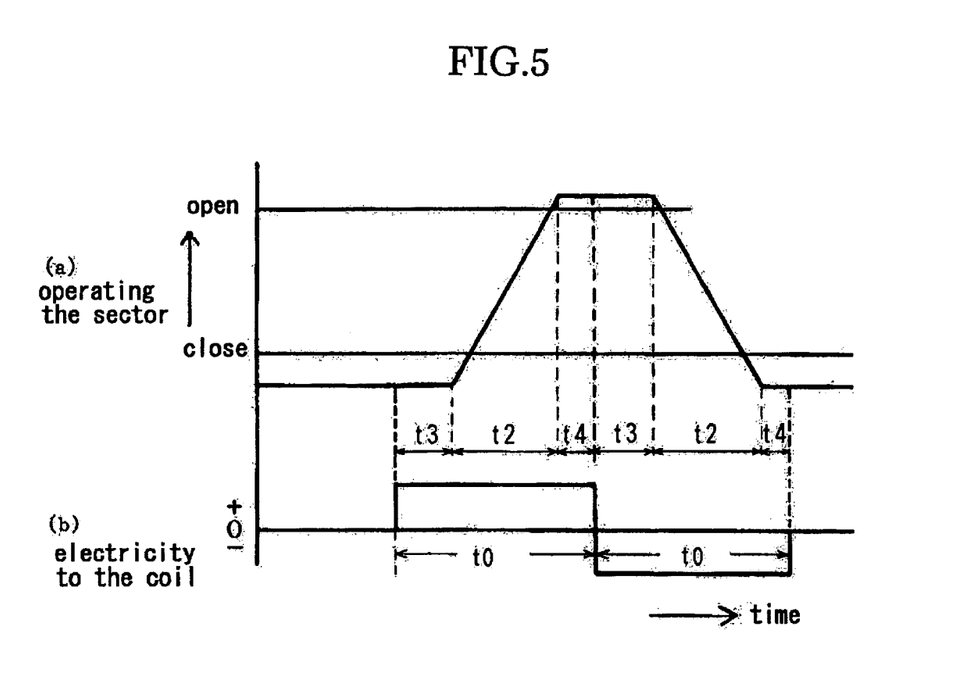
FIG. 5 is a diagram showing a relationship between the operation of opening and closing a shutter sector and the conduction of electricity to a coil of an actuator.

Referring to FIG. 5, an explanation will now be provided of an opening operation of the shutter opening 1a by moving the shutter sectors 4 and 5 from positions shown in FIG. 1 to positions shown in FIG. 3.

In order to operate the sector members, electricity is supplied in a forward or reverse direction (e.g., polarity) to the coil 12 of the actuator 10 for a time period of t0. The supply of electricity to the coil 12 in the forward direction for the time period t0 will first be explained. Initially, the drive pin 7 is disposed at the lower side of the gap x, and the gap x is thus disposed on the upper side of the drive pin 7. When electricity is supplied to the coil in the forward direction, the rotor 13 is rotated in the clockwise direction and the drive lever 6 is pivoted in the clockwise direction via the rotor shaft 13a. As illustrated in FIG. 5, immediately after drive pin 7 begins to move, during a time period t3, the drive pin 7 moves through the gap x without coming into contact with the through-holes 4a and 5a of the shutter sectors 4 and 5, and is thus driven in a no-load state in which the shutter sectors 4 and 5 are not moved by the drive pin 7. Therefore, the shutter opening 1a remains closed. During the time period t3 in which the drive pin 7 passes the gap x and moves to a position at which the drive pin 7 is brought into contact with inner edges of upper portions of the through-holes 4b and 5b, the rotor 13 has reached a sufficient acceleration. After the drive pin 7 is brought into contact with the inner edges of the through-holes, the shutter sectors 4 and 5 are pivoted by the drive pin 7. By that time, the rotational speed of the rotor 13 is fast. Therefore, in order to open the shutter opening 1a by moving the drive pin 7 by an amount of L2 equal to the desired movement amount L1 of the shutter sectors explained with reference to FIG. 6, there is taken a time period t2 shorter than the time period t1 conventionally required. In the state of FIG. 3 in which the shutter opening 1a is opened, pivotal movement of the shutter sector 4 is hampered by the positioning pin 1c. Therefore, during a remaining time period t4 of the time period t0, the shutter opening 1a is maintained in an opened state.

Electricity is supplied to the coil 12 for the time period of t0 to bring the shutter opening 1a into the opened state. Initially, the drive pin 7 is disposed at the upper side of the gap x, as shown in FIG. 4, so that the gap x is disposed on the lower side of the drive pin 7. Therefore, in order to close the shutter, electricity is supplied to the coil to rotate the rotor 13 and pivot the drive lever 6 in the counterclockwise direction via the rotor shaft 13a. As illustrated in FIG. 5, immediately after starting its movement, the drive pin 7 passes through the gap x for a time period of t3. During the time period t3, the drive pin 7 is driven in a no-load state in which the shutter sectors 4 and 5 are not operated and the shutter opening 1a remains opened. When the drive pin 7 has passed through the gap x and is brought into contact with inner edges of lower portions of the through-holes 4b and 5b, the rotor 13 has reached a sufficient acceleration. After the drive pin 7 has been brought into contact with the inner edges of the through-holes, the shutter sectors 4 and 5 are pivoted by the drive pin 7. By that time, the rotational speed of the rotor 13 is fast. Therefore, in order to close the shutter opening 1a by moving the shutter sectors by a desired operating amount L1=L2, there is taken a time period t2 shorter than the time period t1 conventionally required. In the state of FIG. 1, in which the shutter opening 1a is closed, pivotal movement of the sector 4 is hampered by the positioning pin 1b. Therefore, during the remaining time period t4 of the time period t0, the shutter opening 1a is maintained in a closed state.

Figure 10:
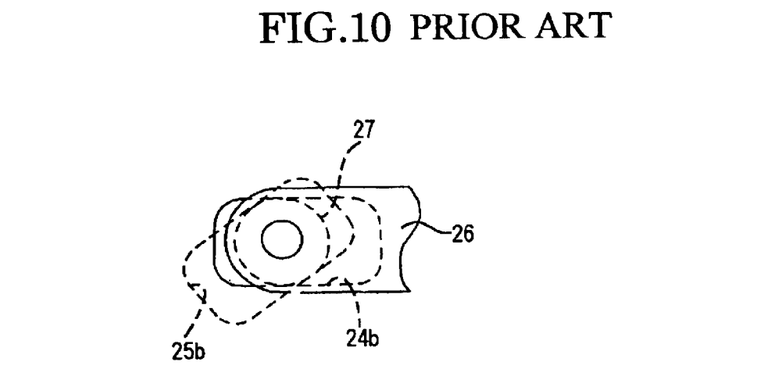
FIG. 10 is an enlarged front view of a portion of FIG. 9.

In order to achieve the desired operating amount L1=L2 of the shutter sectors 4 and 5 needed to open and close the shutter opening 1a in the conventional example shown in FIGS. 9 and 10, a time period of t1 as shown in FIG. 6 is required. In accordance with the present invention, the gap x shown in FIG. 4 is provided and the drive pin 7 is driven in the no-load state immediately after starting movement, so that only a time period of t2 is required. The time period t2 is the time period after the rotor 13 has reached sufficient acceleration or full acceleration. Therefore, the time period t2 is shorter than the time period t1 described above; that is, t2<t1. In other words, during the time period required for operating the shutter sectors 4 and 5 from the state of closing the shutter opening 1a of FIG. 1 to the state of opening the shutter opening 1a of FIG. 3, and conversely, from the state of opening the shutter opening 1a of FIG. 3 to the state of closing the shutter opening 1a of FIG. 1, the drive pin 7 can be operated swiftly and the shutter speed is increased.

As explained above, a time period that the shutter opening 1a remains open is a time period defined by time periods t3+t4 as shown in FIG. 5. The gap x between the drive pin 7 and the through-holes as well as the time period t3 are determined at the point of design. Therefore, when the opening time period of the shutter opening 1a is to be adjusted to a particular photographing condition, the time period t4 may be changed by adjusting a pulse width t0 of a pulse supplied to the coil 12.

A second embodiment of the present invention will now be described with reference to FIGS. 7 and 8. Portions common to those in the first embodiment are denoted by the same reference numerals and a detailed description thereof is omitted. A main difference between the first and second embodiments resides in that the second embodiment has a start lever 14 integrally provided with arm portions 14a and 14b opened in a V-like shape fixedly attached to the rotor shaft 13a to overlap the drive lever 6, and the drive lever 6 is integrally provided with projected portions 6b and 6c and is relatively rotatably with respect to the rotor shaft 13a with a gap formed therebetween. In the first embodiment, no start lever 14 is provided and the drive lever 6 undergoes rotation with the drive shaft 13.

Figure 7:
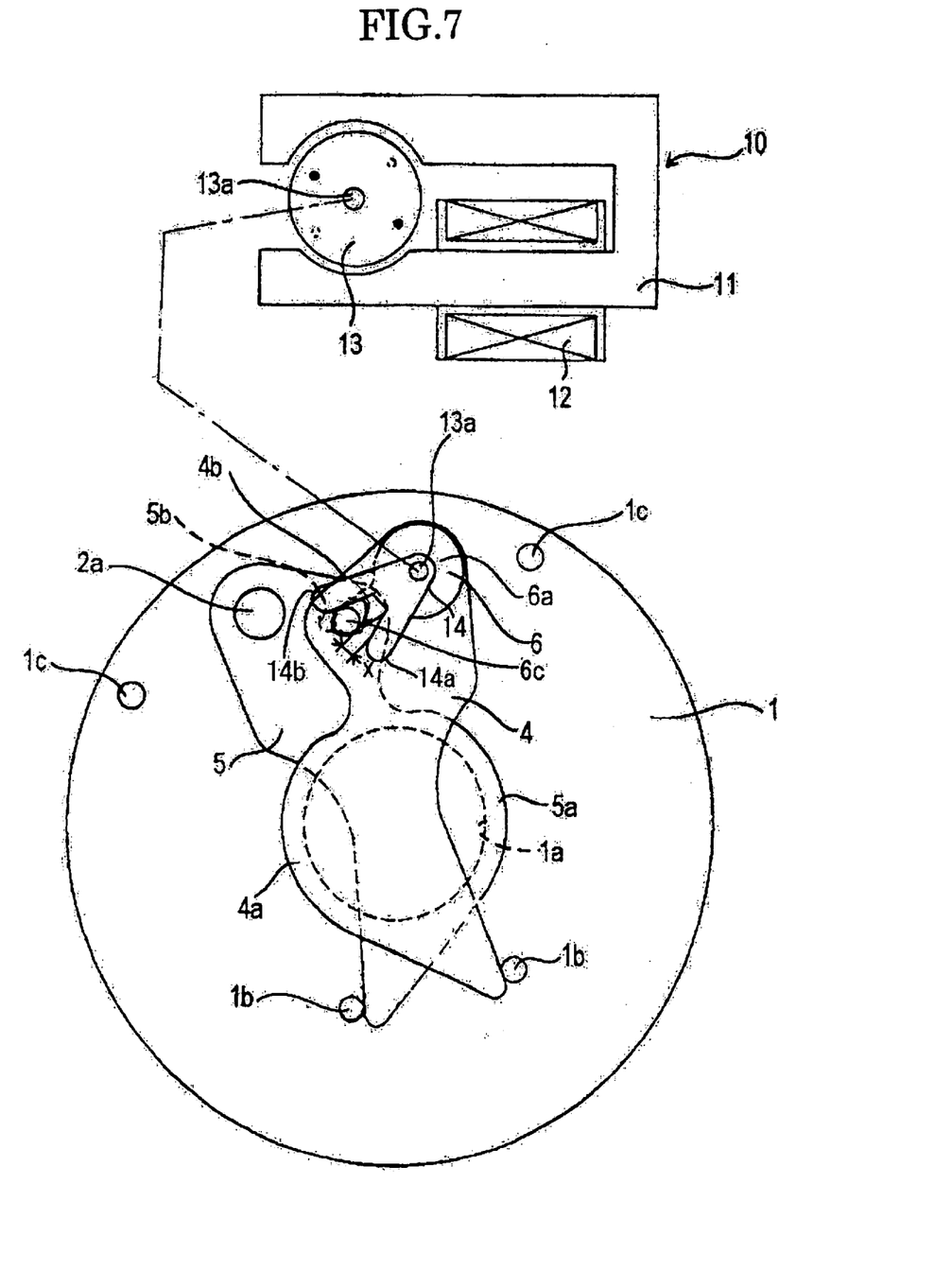
FIG. 7 shows a second embodiment and is a front view in a state of closing the shutter opening.
Figure 8:
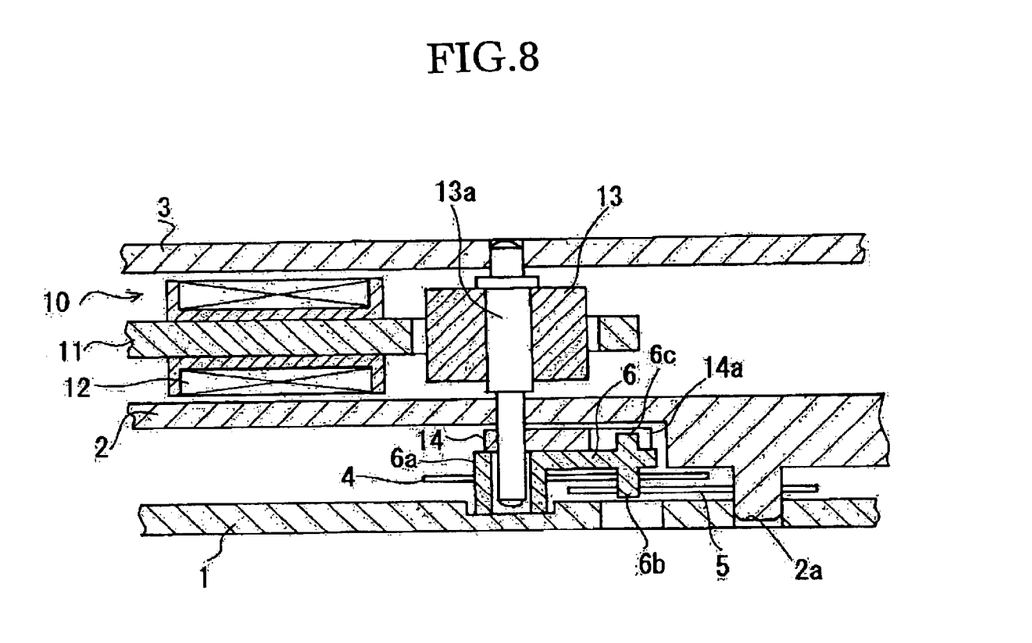
FIG. 8 is a cross-sectional view of a portion of the second embodiment.

As shown by FIG. 7, the projected portion 6c is disposed between the arm portions 14a and 14b of the start lever 14 and there is provided the gap x between the projected portion 6c and the arm portion 14a or 14c. The size of the gap x is in the range of about 0.1 through 0.3 mm similar to the first embodiment. As shown by FIG. 8, the projected portion 6b is fitted to the through-holes 4b and 5b of the sectors 4 and 5. Unlike the first embodiment, only a gap of fitting tolerance is provided between the through-holes 4b and 5b and the projected portion 6b.

By such a construction, when electricity is supplied to the coil 12 of the actuator 10 in order to operate the shutter sectors 4 and 5, the rotor 13 is rotated in the clockwise direction and the start lever 14 is rotated in the clockwise direction via the rotor shaft 13a. Since the drive lever 6 is rotatable relative to the rotor shaft 13a, the drive lever 6 is not rotated but maintains an initial position thereof. Immediately after driving the start lever 14, as shown by FIG. 7, the start lever 14 is driven in a no-load state by an amount of the gap x and the sectors 4 and 5 are not operated so that the shutter opening 1a remains closed.

During a time period in which the start lever 14 is rotated by the amount of the gap x and the arm portion 14a is brought into contact with the projected portion 6c, rotation of the rotor 13 is sufficiently accelerated. After the arm portion 14a has been brought into contact with the projected portion 6c, the shutter sectors 4 and 5 are pivoted by rotating the start lever 14. At that point, the rotational speed of the rotor 13 is fast. Therefore, the shutter opening 1a can be opened in a short period of time similar to that of the first embodiment.

Further, although according to the second embodiment, the projected portions 6b and 6c are provided integrally with the drive lever 6, similar to the first embodiment, the projected portion 6c may comprise a separate member and the size of the gap x may be adjustable by rotating the projected portion 6c. Further, there may be provided a construction in which the gap x is provided between the through-holes 4b and 5b and the projected portion 6b similar to the first embodiment.

As described above, in the shutter for a camera according to the present invention, the size of the through-holes penetrated by the operating member is set to a size sufficient for driving the operating member substantially in a no-load state immediately after starting the operating member. Alternatively, there is provided a gap having a size sufficient for driving the starting member substantially in the no-load state until the starting member is brought into contact with an operating member between the starting member and the operating member. Accordingly, the shutter sectors are not moved immediately after starting movement in which the operating member or the starting member has not yet reached sufficient or full acceleration. After the operating member or the starting member has been sufficiently accelerated, the shutter sectors are operated instantly and the desired operating amount of the sectors can be achieved in a short period of time, which is effective for increasing the shutter speed. Further, when the width of a region in which the operating member or the starting member is driven in the no-load state immediately after the starting movement is made adjustable, the shutter speed can be adjusted by adjusting the width of the region.

We claim:

1. A shutter for a camera, comprising: a base plate having a shutter opening formed therein; at least one shutter sector disposed adjacent the base plate for opening and closing the shutter opening and having a through-hole formed therein; an operating member having a projection penetrating the through-hole of the shutter sector to cause the shutter sector to undergo movement therewith to selectively open and close the shutter opening; and an actuator for driving the operating member; wherein a gap is provided between the through-hole and the projection in a direction of movement of the projection and having a sufficient size such that the operating member is driven without the projection coming into contact with the shutter sector immediately after the actuator starts to drive the operating member to open or close the shutter opening, and is caused to accelerate before the projction comes into contact with the shutter sector to cause the shutter sector to undergo movement therewith.

2. A shutter for a camera according to claim 1; wherein the at least one shutter sector comprises a pair of pivotally mounted shutter sectors simultaneously pivoted by the projection of the operating member to cover the shutter opening when in a closed state and to open the shutter opening when in an opened state.

3. A shutter for a camera according to claim 1; wherein at least one of the operating member and the shutter sector is adjustable to adjust a distance by which the operating member is driven before the projection comes into contact with the shutter sector.

4. A shutter for a camera according to claim 1; wherein a distance between confronting surfaces of the projection and the through-hole is adjustable to adjust a distance by which the operating member is driven before the projection comes into contact with the shutter sector.

5. A shutter for a camera according to claim 1; wherein the actuator comprises a motor having a stator, a rotor, and a rotor shaft extending from the rotor; and the operating member comprises a lever engaged to the rotor shaft to undergo rotation therewith, the projection extending from the lever.

6. A shutter for a camera according to claim 5; wherein the projection is rotatably engaged to the lever.

7. A shutter for a camera according to claim 6; wherein the projection has an irregularly shaped outer peripheral surface so that angular displacement thereof changes a distance between confronting surfaces of the projection and the through-hole to adjust a distance by which the operating member is driven before the projection comes into contact with the shutter sector.

8. A shutter for a camera according to claim 1; further comprising an upper plate spaced apart from the base plate, and a middle plate disposed between the base plate and the upper plate so that the respective plates are spaced apart from each other by predetermined intervals; wherein the shutter sector and the operating member are disposed between the base plate and the middle plate.

9. A shutter for a camera according to claim 8; wherein the actuator is provided between the middle plate and the upper plate.

10. A shutter for a camera according to claim 9; wherein the actuator comprises a U-shaped metal core, a coil wound around one leg of the core, and a rotor magnetically coupled to the core.

11. A shutter for a camera according to claim 10; wherein the operating member has a lever engaged to the rotor to undergo rotation therewith, the projection extending from the lever for pivotally driving the shutter sector.

12. A shutter for a camera according to claim 11; wherein the rotor has a shaft extending therefrom to penetrate an opening formed in the middle plate, a distal end of the shaft being fitted to the lever of the operation member to pivotally drive the operating member.

13. A shutter for a camera according to claim 12; wherein the shutter sector has a base portion pivotally mounted to one of the base plate and the middle plate and undergoes pivotal movement about the base portion in response to pivotal movement of the lever and projection.

14. A shutter for a camera according to claim 1; further comprising a positioning pin extending from the base plate for restricting movement of the shutter sector such that when closing the shutter opening the shutter sector is brought into contact with the positioning pin.

15. A shutter for a camera, comprising: a base plate having a shutter opening formed therein; at least one shutter sector disposed adjacent the base plate for opening and closing the shutter opening and having a through-hole formed therein; an operating member having a projection penetrating the through-hole to cause the shutter sector to undergo movement therewith to selectively open and close the shutter opening; a start member for driving the operating member to move the shutter sector; and an actuator for driving the start member; wherein a gap in a direction of movement of the projection is provided between the start member and the operating member, the gap having a size sufficient so that the start member is driven without the projection coming into contact with the operating member immediately after the actuator starts to drive the start member to open or close the shutter opening, and the start member is caused to accelerate before the projection comes into contact with the operating member to cause the shutter sector to undergo movement therewith.

16. A shutter for a camera according to claim 15; wherein the start member is adjustable to adjust a width of a region in which the start member is driven without the projection coming into contact with the operating member.

17. A shutter for a camera according to claim 15; wherein the at least one shutter sector comprises a pair of pivotally mounted shutter sectors simultaneously pivoted by the operating member to cover the shutter opening when in a closed state and the open the shutter opening when in an opened state.

18. A shutter for a camera according to claim 15; wherein the actuator comprises a motor having a stator, a rotor, and a rotor shaft extending from the rotor; and the start member is engaged to the rotor shaft to undergo rotation therewith.

19. A shutter for a camera according to claim 18; wherein the start member is generally U-shaped and has a pair of arms surrounding a projection extending from the operating member and being spaced therefrom by the gap.

20. A shutter for a camera according to claim 15; further comprising a positioning pin extending from the base plate for restricting movement of the shutter sector such that when closing the shutter opening the shutter sector is brought into contact with the positioning pin.

* * * * *